United States Patent [19]

Sprague et al.

[11] 4,367,925
[45] Jan. 11, 1983

[54] INTEGRATED ELECTRONICS FOR PROXIMITY COUPLED ELECTRO-OPTIC DEVICES

[75] Inventors: Robert A. Sprague, Saratoga; William D. Turner, San Marino, both of Calif.

[73] Assignee: Xerox Corporation, Stamford, Conn.

[21] Appl. No.: 188,171

[22] Filed: Sep. 17, 1980

[51] Int. Cl.³ ............................................. G02F 1/01
[52] U.S. Cl. .................................. 350/355; 350/353; 350/356; 350/357; 350/358
[58] Field of Search ....................... 350/353, 355–358

[56] References Cited
U.S. PATENT DOCUMENTS

| | | | |
|---|---|---|---|
| 3,958,862 | 5/1976 | Scibor-Rylski | 350/356 |
| 4,125,318 | 11/1978 | Scibor-Rylski | 350/356 |
| 4,281,904 | 8/1981 | Sprague et al. | 350/356 |

Primary Examiner—William L. Sikes
Assistant Examiner—Leon Scott, Jr.

[57] ABSTRACT

The electronics for driving one or more electrodes of an electro-optic device, such as a multi-gate light valve for an electro-optic line printer, are embodied in an integrated electrical circuit, such as a LSI silicon integrated circuit. A conductive film, such as a metalization layer or a polysilicon layer, is deposited on the silicon circuit to electrically connect to the integrated drive electronics, and the electrodes are defined by patterning the conductive film. To complete the electro-optic device, the integrated circuit is held against an electro-optic element so that the electric fields created when voltages are applied to the electrodes are proximity coupled into the electro-optic element.

9 Claims, 8 Drawing Figures

INTEGRATED ELECTRONICS FOR PROXIMITY COUPLED ELECTRO-OPTIC DEVICES

BACKGROUND OF THE INVENTION

This invention relates to electro-optic devices and, more particularly, to proximity coupled light valves for electro-optic line printers and the like.

It has been shown that an electro-optic element having a plurality of individually addressable electrodes can be used as a multi-gate light valve for line printing. See, for example, a copending and commonly assigned U.S. patent application of R. A. Sprague et al., which was filed June 21, 1979 under Ser. No. 040,607 on a "TIR Electro-Optic Modulator with Individually Addressed Electrodes." Also see "Light Gates Give Data Recorder Improved Hardcopy Resolution," *Electronic Design*, July 19, 1979, pp. 31–32; "Polarizing Filters Plot Analog Waveforms," *Machine Design*, Vol. 51, No. 17, July 26, 1979, p. 62; and "Data Recorder Eliminates Problem of Linearity," *Design News*, Feb. 4, 1980, pp. 56–57.

As is known, almost any optically transparent electro-optical material can be used as the electro-optic element of such a light valve. The most promising materials now appear to be $LiNbO_3$ and $LiTaO_3$, but there are other materials which qualify for consideration, including BSN, KDP, $KD^xP$, $Ba_2NaNb_5O_{15}$ and PLZT. In any event, the electrodes of such a light valve are intimately coupled to the electro-optic element and are distributed in non-overlapping relationship widthwise of the electro-optic element (i.e., orthogonally relative to its optical axis), typically on equidistantly separated centers so that there is a generally uniform interelectrode gap spacing. A copending and commonly assigned U.S. patent application of W. D. Turner, which was filed Sept. 17, 1980 under Ser. No. 187,936 on "Proximity Coupled Electro-Optic Devices", shows that the electrodes of an electro-optic device, such as a multi-gate light valve, may be fabricated on a suitable substrate and pressed against or held very close to the electro-optic element to provide what is referred to a "proximity coupling".

To perform line printing with a multi-gate light valve of the foregoing type, a photosensitive recording medium, such as a xerographic photoreceptor, is exposed in an image configuration as it advances in a cross line direction (i.e., a line pitch direction) relative to the light valve. More particularly, to carry out the exposure process, a sheetlike collimated light beam is transmitted through the electro-optic element of the light valve, either along its optical axis for straight through transmission or at a slight angle relative to that axis for total internal reflection. Furthermore, successive sets of digital bits or analog signal samples (hereinafter collectively referred to as "data samples"), which represent respective collections of picture elements or pixels for successive lines of the image, are sequentially applied to the electrodes. As a result, localized electric bulk or fringe fields are created within the electro-optic element in the immediate vicinity of any electrodes to which non-reference level data samples are applied. These fields, in turn, cause localized variations in the refractive index of the electro-optic element within an interaction region (i.e., a light beam illuminated region of the electro-optic element which is subject to being penetrated by the electric fields). Thus, the phase front or polarization of the light beam is modulated (hereinafter generically referred to as "p-modulation" of the light beam) in accordance with the data samples applied to the electrodes as the light beam passes through the interaction region. Schlieren readout optics may be used to convert a phase front modulated light beam into a light beam having a correspondingly modulated intensity profile. For example, the phase front modulated light beam may be imaged onto the recording medium by central dark field or central bright field imaging optics. Alternatively, if the input light beam is polarized, a polarization modulation to intensity modulation conversion process may be performed by passing the polarization modulated output beam through a polarization analyizer. In more generic terms, the p-modulation of the light beam is converted into a correspondingly modulated intensity profile by using "p-sensitive readout optics" to image or project (hereinafter collectively referred to as imaging) the light beam onto the recording medium.

SUMMARY OF THE INVENTION

In accordance with this invention, the electronics for driving one or more electrodes of an electro-optic device, such as a multi-gate light valve for an electro-optic line printer, are part of an integrated electrical circuit, such as a LSI silicon circuit. A conductive film, such as a metalization layer or a polysilicon layer, is deposited on the integrated circuit to electrically connect to the integrated drive electronics, and the electrodes are defined by patterning the conductive film. To complete the electro-optic device, the electrode bearing surface of the integrated circuit is held against an electro-optic element so that the electric fields that are created when voltages are applied to the electrodes are proximity coupled into the electro-optic element.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
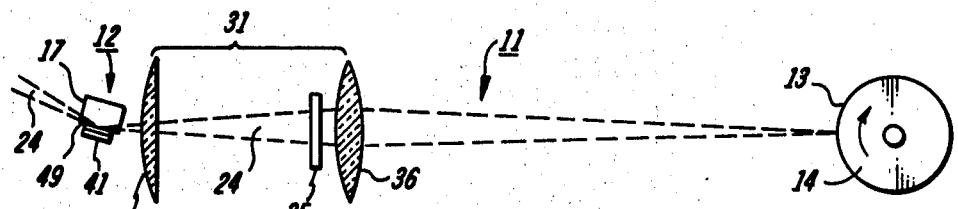
FIG. 1 is a schematic side view of an electro-optic line printer including a proximity coupled TIR multi-gate light valve which embodies the present invention.
Figure 2:
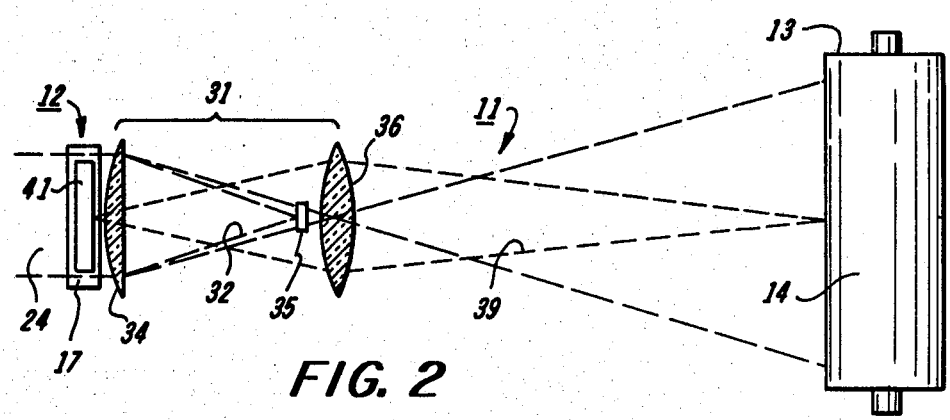
FIG. 2 is a schematic bottom plan view of the electro-optic line printer shown in FIG. 1.

Turning now to the drawings, and at this point especially to FIGS. 1 and 2, there is an electro-optic line printer 11 comprising a multi-gate light valve 12 for exposing a photosensitive recording medium 13 in an image configuration. The recording medium 13 is depicted as being a photoconductively coated xerographic drum 14 which is rotated (by means not shown) in the direction of the arrow. It nevertheless will be evident that there are other xerographic and non-xerographic recording media that could be used, including photoconductively coated xerographic belts and plates, as well as photosensitive film and coated paper in web or cut sheet stock form. The recording medium 13 should, therefore, be visualized in the generalized case as being a photosensitive medium which is exposed in an image configuration while advancing in a cross line or line pitch direction relative to the light valve 12.

Figure 3:
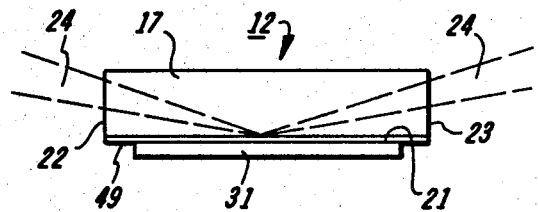
FIG. 3 is an enlarged side view of a TIR light valve for the electro-optic line printer of FIGS. 1 and 2.
Figure 4:
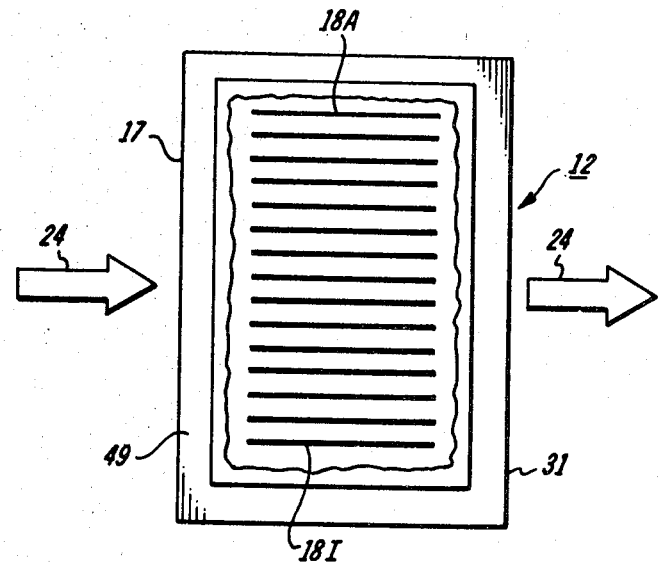
FIG. 4 is an enlarged cutaway bottom view of the TIR light valve of FIG. 3 showing a pattern of individually addressable electrodes.

As shown in FIGS. 3 and 4, the light valve 12 includes an electro-optic element 17 and a plurality of individually addressable electrodes 18a–18i. For a total internal reflection (TIR) mode of operation as illustrated, the electro-optic element 17 typically is a y cut crystal of, say, $LiNbO_3$ having an optically polished reflecting surface 21 which is integral with and disposed between optically polished input and output faces 22 and 23, respectively. The electrodes 18a–18i are intimately coupled to the electro-optic element 17 adjacent the reflecting surface 21 and are distributed across essentially the full width thereof. Typically, the electrodes 18a–18i are 1–30 microns wide and are on centers which are more or less equidistantly separated to provide a generally uniform interelectrode gap spacing of 1–30 microns. In this particular embodiment the electrodes 18a–18i extend generally parallel to the optical axis of the electro-optic element 17 and have projections of substantial length along that axis. Alternately, the electrodes 18a–18i could be aligned at the so-called Bragg angle relative to the optical axis of the electro-optic element 17. As will be appreciated, if the electrodes 18a–18i are aligned parallel to the optical axis of the electro-optic element 17, the light valve 12 will produce a diffraction pattern which is symmetrical about the zero order diffraction component. If, on the other hand, the electrodes 18a–18i are at the Bragg angle relative to the optical axis of the electro-optic element 17, the light valve 12 will produce an asymmetrical diffraction pattern.

Briefly reviewing the operation of the line printer 11 depicted in FIGS. 1–4, a sheet-like collimated beam of light 24 from a suitable source, such as a laser (not shown), is transmitted through the input face 22 of the electro-optic element 17 at a grazing angle of incidence relative to the reflecting surface 21. The light beam 24 is brought to a wedge shaped focus (by means not shown) at approximately the centerline of the reflecting surface 21 and is totally internally reflected therefrom for subsequent transmission through the output face 23. As will be seen, the light beam 24 illuminates substantially the full width of the electro-optic element 17 and is phase front modulated while passing therethrough in accordance with the differentially encoded data samples applied to the electrodes 18a–18i.

Figure 5:
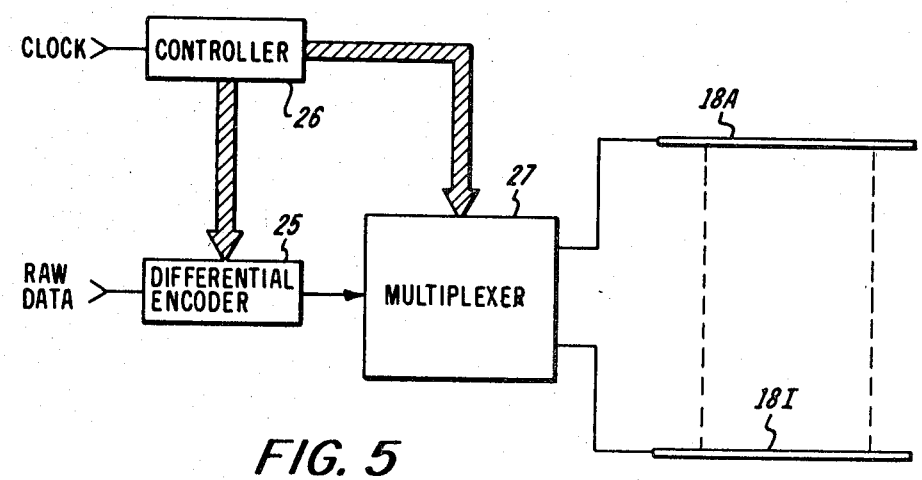
FIG. 5 is a simplified block diagram of a system for applying differentially encoded serial input data to the individually addressable electrodes of the electrode pattern shown in FIG. 4.

More particularly, as shown in FIG. 5, serial input data samples, which represent picture elements for successive lines of an image, are applied to a differential encoder 25 at a predetermined data rate. The encoder 25 differentially encodes the input samples on a line-by-line basis in response to control signals from a controller 26, and a multiplexer 27 ripples the encoded data samples onto the electrodes 18a–18i at a ripple rate which is matched to the data rate in response to further control signals from the controller 26. The input data may, of course, be buffered (by means not shown) to match the input data rate to any desired ripple rate. Additionally, the input data may be processed (by means also not shown) upstream of the encoder 25 for text editing, formatting or other purposes, provided that the data samples for the ultimate image are applied to the encoder 25 in adjacent picture element sequence. See, for example, a commonly assigned U.S. patent application of William Gunning et al., which was filed Apr. 5, 1978 under Ser. No. 893,658.

Differential encoding is described in substantial detail in a copending and commonly assigned U.S. patent application of W. D. Turner et al., which was filed Sept. 17, 1980 under Ser. No. 187,916 on "Differential Encoding for Fringe Field Responsive Electro-Optic Line Printers." Thus it will suffice to note that each differentially encoded data sample, other than the first sample for each line of the image, has a magnitude whose difference from the previous differentially encoded data sample corresponds to the magnitude of a respective input data sample. The first sample for each line of the image is referenced to a common reference potential, such as ground. Thus, all picture elements are faithfully represented by the electrode to electrode voltage drops that are produced in response to the differentially encoded data.

Figure 6:
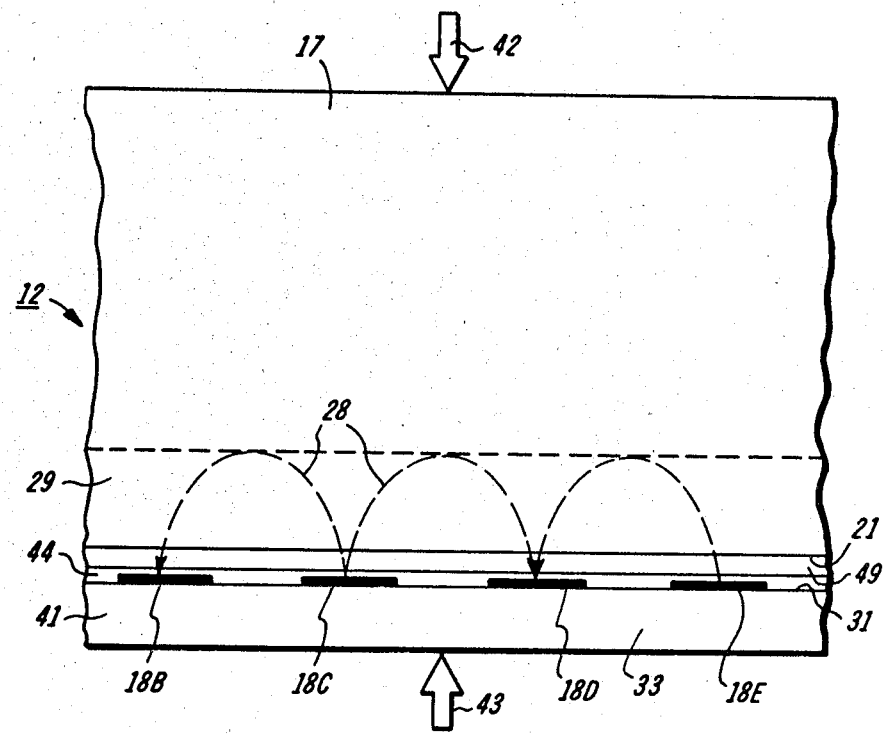
FIG. 6 is an enlarged and fragmentary schematic end view of the TIR light valve shown in FIG. 3 to better illustrate the proximity coupling of the electrodes to the electro-optic element and the interaction which occurs within the electro-optic element between the light beam and the electric fringe fields.

Referring to FIG. 6, the electrode to electrode voltage drops create localized fringe fields 28 within an interaction region 29 of the electro-optic element 17, and the fringe fields 28 cause localized variations in the refractive index of the electro-optic element 17 widthwise of the interaction region 29. The voltage drop between any adjacent pair of electrodes, such as 18b and 18c or 18c and 18d, determines the refractive index for the portion of the interaction region 29 which bridges between those two electrodes. Hence, the refractive index variations within the interaction region 29 faithfully represent the input data samples appearing on the electrodes 18a–18i in differentially encoded form at any given point in time. It therefore follows that the phase front of the light beam 24 (FIG. 3) is sequentially spatially modulated in accordance with the data samples for successive lines of the image as the light beam 24 passes through the interaction region 27 of the electro-optic element 17.

Returning for a moment to FIGS. 1 and 2, to expose the recording medium 13 in an image configuration, there suitably are Schlieren central dark field imaging optics 31 which are optically aligned between the electro-optic element 17 and the recording medium 13 for imaging the light beam 24 onto the recording medium 13. The imaging optics 31 convert the spatial phase front modulation of the light beam 24 into a correspondingly modulated intensity profile and provide any magnification that is required to obtain an image of a desired width. To accomplish that, the illustrated imaging optics 31 include a field lens 34 for focusing the zero order diffraction components 32 of the phase front modulated light beam 24 onto a central stop 35 and an imaging lens 36 for imaging the higher order diffraction components onto the recording medium 13, i.e., the image plane for the light valve 12. The field lens 34 is optically aligned between the electro-optic element 17 and the stop 35 so that substantially all of the zero order components 32 of the light beam 24 are blocked by the stop 35. The higher order diffraction components of the light beam 24 scatter around the stop 35 and are collected by the imaging lens 36 which, in turn, causes them to fall onto the light valve image plane defined by the recording medium 13. Of course, other p-sensitive readout optics could be used to convert the phase front or polarization modulated light beam provided by the electro-optic element 17 into a light beam having a correspondingly modulated intensity profile.

To summarize, as indicated in FIG. 2 by the broken lines 39, each neighboring pair of electrodes, such as 18b and 18c (FIG. 6), cooperates with the electro-optic element 17 and with the p-sensitive readout optics 31 to effectively define a local modulator for creating a picture element at a unique, spatially predetermined position along each line of the image. Accordingly, the number of electrodes 18a–18i determines the number of picture elements that can be printed per line of the image. Moreover, by sequentially applying successive sets of differentially encoded data samples to the electrodes 18a–18i while the recording medium 13 is advancing in a cross line direction relative to the light valve 12, successive lines of the image are printed.

Figure 7:
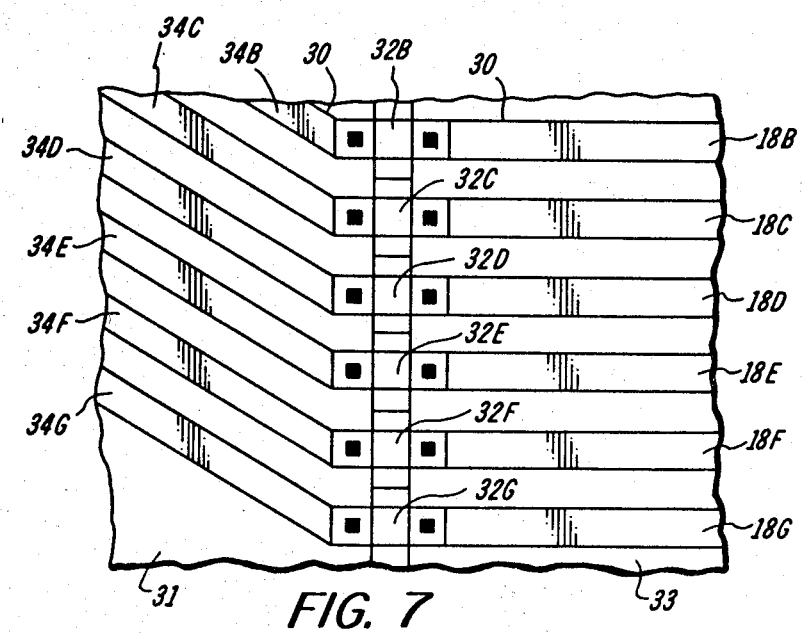
FIG. 7 is an enlarged and fragmentary schematic plan view of the electrode pattern of FIG. 4 as embodied on a silicon integrated circuit in accordance with this invention.

In accordance with the present invention, as best shown in FIG. 7, the electrodes 18a–18i are defined by a suitably patterned, electrically conductive layer, generally indicated by 30, which is deposited on and a part of an integrated electrical circuit 31, such as a LSI (large scale integrated) silicon circuit, to make electrical contact to the integrated drive electronics 32b–32g. For example, as illustrated, the multiplexer 27 is embodied in the integrated circuit 31, and the electrodes 18a–18i are an extension of the metalization or polysilicon layer 30 which is used to make electrical connections to the output transfer gates or pass transistors 32b–32g and other individual components (not shown) of the multiplexer 27. The pass transistors 32b–32g and the other components of the multiplexer 27 are formed on the integrated circuit 31 by using more or less standard LSI component fabrication techniques, and the metalization or polysilicon layer 30 is thereafter deposited on the outer surface 33 of the integrated circuit 31. An etching process or the like is then used to pattern the electrically conductive layer 30 as required to provide electrically independent connections to the electrically independent components of the multiplexer 27 in keeping with standard practices and to form the electrically independent electrodes 18a–18i (only the electrodes 18b–18g can be seen in FIG. 7) in keeping with this invention. For instance, the data transfer lines 34b–34g for the pass transistors 32b–32g are defined in the metalization or polysilicon layer 30 by the same etching process which is used to define the electrodes 18a–18i.

Referring again to FIG. 6, the electrodes 18a–18i are proximity coupled to the electro-optic element 17 to enable the light valve 12 to perform as previously described. To carry out the proximity coupling, a bonding agent, such as the clamp schematically represented by the arrows 42 and 43, is engaged with the electro-optic element 17 and with the silicon integrated circuit 31 to urge the electrodes 18a–18i into pressure contact with the reflecting surface 23 of the electro-optic element 17. An adhesive or suction might be used as the bonding agent in place of or in combination with the clamp 42 and 43. Regardless of the bonding agent selected, a small gap 44 is likely to exist over an appreciable portion of the interface between the electrodes 18a–18i and the reflecting surface 23 due to unavoidable imperfections in the flatness of those elements and to the presence of any foreign matter, such as dust particles (not shown), which may be entrapped in the gap 44. The interelectrode gap spacing of the electrodes 18a–18i must be sufficiently large relative to the maximum width of the gap 44 to ensure that the fringe fields 28 span the gap 44 and penetrate the electro-optic element 17 to interact with the light beam 24 as previously described.

If a significant portion of the overall surface area of the electrodes 18a–18i is in direct contact with the reflecting surface 21 of the electro-optic element 17, the light beam 24 may experience an unacceptable level of spurious phase and amplitude modulation under quiescent conditions (i.e., in the absence of any voltage drops across the electrodes). To avoid that, a thin dielectric layer 49 of, say, $SiO_2$, may be overcoated either on the reflecting surface 21, as shown, or on the electrode bearing surface of the integrated circuit 31 (not shown), thereby isolating the electrodes 18a–18i from the reflecting surface 21. The dielectric layer 49 is selected to have an index of refraction which is less than the quiescent index of refraction of the electro-optic element 17, and the thickness of the dielectric layer 49 is controlled so that it is substantially less than the interelectrode gap spacing (e.g., a $SiO_2$ layer 49 having a thickness on the order of 1000 angstroms will provide ample isolation to avoid electrode induced spurious modulation of the light beam 24). Thus, the fields 28 may be coupled into the electro-optic element 17 via the dielectric layer 49 without suffering an unacceptable degree of attenuation.

Figure 8:
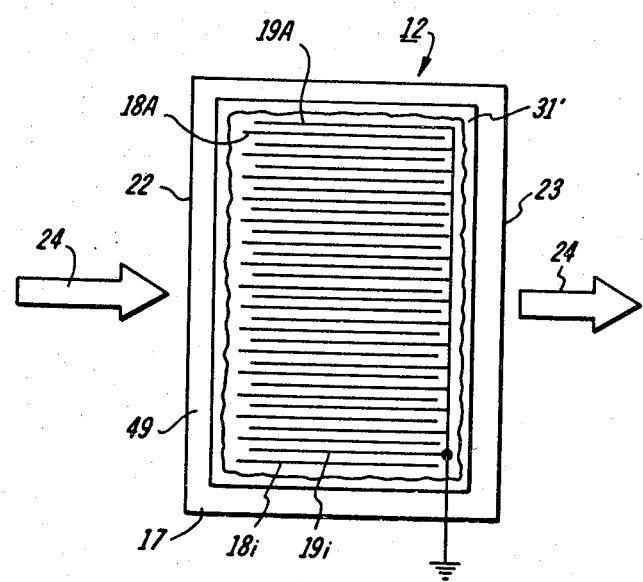
FIG. 8 is a enlarged cutaway bottom view of a TIR light valve having an alternative electrode pattern.

As shown in FIG. 8, the present invention may also be used to provide an alternating pattern of individually addressable electrodes $18a^1 18i^1$ and ground plane electrodes $19a^1–19i^1$. As is known, such an electrode pattern may be used if the input data samples are not differentially encoded.

CONCLUSION

In view of the foregoing, it will be understood that the present invention provides an improved method and means for interconnecting the electrodes of an electro-optic device, such as a multi-gate light valve for an electro-optic line printer, with the electrode drive electronics. Moreover, it will be appreciated that the integrated electrodes provided by this invention are especially well suited for use in proximity coupled electro-optic devices.

What is claimed is:

1. In an electro-optic device including
   an electro-optic element,
   a plurality of electrodes intimately coupled to said electro-optic element, and
   means coupled to said electrodes for applying voltages thereto, wherebyelectric fields are created within said electro-optic element;
   the improvement comprising an integrated circuit containing electronics for driving at least one of said electrodes, a conductive layer deposited on said integrated circuit, said conductive layer making electrical connections to said electronics and being patterned to define at least said one electrode, and means engaged with said electro-optic element and with said integrated circuit for maintaining the electrode defined by said conductive layer within a small gap distance of said electro-optic element, thereby proximity coupling said fields into said electro-optic element.

2. The improvement of claim 1 wherein:

all of said electrodes are defined by the patterning of said conductive layer, and said electrodes are spaced apart from one another by at least a minimum interelectrode gap spacing to create electric fringe fields in response to said voltages;

said minimum interelectrode gap spacing is sufficiently greater than said gap distance to cause said fringe fields to penetrate into said electro-optic element; and said means for applying said voltages to said electrodes is coupled to said electrodes by said integrated electronics, whereby connections for applying said voltages to said electrodes are made remotely from said electro-optic element.

3. The improvement of claim 2 wherein:

said integrated circuit is a silicon integrated circuit.

4. The improvement of claim 2 wherein:

said electro-optic element is optically transmissive and has a predetermined optical axis and a reflective surface which is generally parallel to said optical axis, said electro-optic device further includes means for applying a sheet-like, collimated light beam to said electro-optic element at a grazing angle of incidence relative to said reflective surface, whereby said light beam is totally internally reflected from said reflected surface, and said electrodes are proximity coupled to said electro-optic element adjacent said reflective surface and have projections of substantial length along said optical axis, whereby said light beam interacts with said fringe fields as it approaches toward and recedes from said reflective surface, thereby causing said light beam to be modulated in accordance with said voltages.

5. The improvement of claim 4 wherein:

said electro-optic element is an electro-optic crystal having an optically polished input face through which said light beam enters said crystal and an optically polished output face through which said light beam exits said crystal, and said reflective surface is another optically polished face of said crystal which is disposed between said input face and said output face.

6. The improvement of claim 2 wherein:

said electro-optic element is optically transmissive and has a predetermined optical axis, said electro-optic device further includes means for transmitting a sheet-like collimated light beam through said electro-optic element, said electrodes are spaced apart orthogonally relative to said optical axis and widthwise of said light beam, at least every other one of said electrodes is independently addressable, said means for applying voltages to said electrodes is coupled to said electrodes by said electronics and operates to cyclically apply respective data samples to said independently addressable electrodes, the data samples applied during any one of said cycles representing picture elements for a respective line of said image, and the data samples applied during successive cycles representing picture elements for successive lines of said image, whereby said fringe fields sequentially modulate said light beam in accordance with the picture elements for successive lines of said image.

7. The improvement of claim 6 wherein:

said electro-optic element has a reflective surface which is generally parallel to said optical axis, said light beam is applied to said electro-optic element at a grazing angle of incidence relative to said reflective surface to be totally internally reflected therefrom, said electrodes are proximity coupled to said electro-optic element adjacent said reflective surface and have projections of substantial length along said optical axis, whereby said light beam interacts with said fringe fields as said light approaches toward and recedes from said reflective surface.

8. The improvement of claim 6 wherein:

said independently addressable electrodes alternate with electrodes which are referenced to a predetermined potential, and said data samples are referenced to said predetermined potential.

9. The improvement of claim 6 wherein:

said independently addressable electrodes are the only electrodes for said electro-optic device, and said data samples are differentially encoded.

* * * * *